United States Patent [19]

Joo et al.

[11] 3,989,802

[45] Nov. 2, 1976

[54] TREATMENT OF CARBON FIBERS

[75] Inventors: Louis A. Joo; Roger Prescott; Gordon E. Sharpe; Frank E. Snodgrass, all of Johnson City, Tenn.

[73] Assignee: Great Lakes Carbon Corporation, New York, N.Y.

[22] Filed: Mar. 21, 1973

[21] Appl. No.: 343,587

Related U.S. Application Data

[63] Continuation-in-part of Ser. No. 10,639, Feb. 11, 1970, abandoned.

[52] U.S. Cl. .............................. 423/447.1; 106/307
[51] Int. Cl.$^2$ .......................................... C01B 31/07
[58] Field of Search ............ 423/447, 460; 106/307; 264/29; 260/37

[56] References Cited
UNITED STATES PATENTS

| | | | |
|---|---|---|---|
| 3,532,466 | 10/1970 | Johnson et al. | 423/447 |
| 3,642,513 | 2/1972 | Sach et al. | 423/447 |

FOREIGN PATENTS OR APPLICATIONS

| | | | |
|---|---|---|---|
| 1,551,282 | 12/1968 | France | 423/447 |

OTHER PUBLICATIONS

"Integrated Research on Carbon Composite Materials" Summary Tech. Report AFML–TR–66–310, Part III, Jan. 1969, pp. 54, 55, & 56.
Harris et al. "Journal of Materials Science," 4 (1969) pp. 432–438.
Miyamichi et al. "Chemical Abstracts", vol. 64, 1966, 12862.

*Primary Examiner*—Edward J. Meros
*Attorney, Agent, or Firm*—Donald R. Cassady

[57] ABSTRACT

Carbon fibers are surface oxidized by contacting the fiber with an aqueous solution comprising 5 – 20 weight percent sodium dichromate and 15 – 45 percent sulfuric acid for from one to sixty minutes at about the boiling point of the mixture. These fibers are useful in making resin-based composites by improving the adhesion between the fibers and the resin.

1 Claim, No Drawings

3,989,802

TREATMENT OF CARBON FIBERS

RELATION TO PREVIOUS APPLICATIONS

This application is a continuation-in-part of copending application Ser. No. 10,639, filed Feb. 11, 1970, now abandoned.

BACKGROUND OF THE INVENTION

Composite materials, for use in the aerospace industry, are well-known to the art. Such materials comprise a resinous binder, as for example a polymerized epoxide and a filler, as for example asbestos, glass fibers, or carbon fibers.

Of the above named fillers, carbon fibers have received attention due to their high corrosion and temperature resistance, low density, high tensile strength and high modulus of elasticity.

Uses for such carbon-fiber reinforced composites include aerospace structural components, rocket motor casings, deep submergence vehicles, and ablative materials for heat shields on re-entry vehicles.

The incorporation of carbon or graphite particles in resin bases in amounts of up to 60 percent by volume will impart a heat-conducting property but not an electrical conductivity to the component. However, Litant, in U.S. Pat. No. 3,406,126, teaches that the addition of a carbon yarn in as little as 0.05 percent by volume to the resinous matrix imparts electrical conductivity to the resulting composite. Such composites can be prepared from polyesters, polyvinyl chloride, polyepoxides, or like resins, and carbonized rayon, polyacrylonitrile, or like fibers.

Composites containing Acrilan, Orlon, polyacrylonitrile, rayon, and like-based carbon fibers have been described by Litant. These composites are electrically conductive materials which are useful as electrical brushes and contacts, and as structural units in conductive flooring, wall panelling, and the like.

When composites such as these are manufactured from a highly oriented precursor as for example from carbon fibers, stretched and graphitized by the method of Prescott U.S. Pat. No. 3,533,743 or Spry U.S. Pat. No. 3,454,362, a high modulus composite is produced.

Such high modulus composites usually have low interlaminar shear strengths of about 3000 to 4000 p.s.i. These low shear strengths are probably due to poor bonding between the carbon fibers and the matrix. Attempts to improve this bonding, particularly between rayon-based carbon fiber fillers and an epoxy-matrix have been partially successful, but have resulted in a degradation of the ultimate tensile strength of the fiber and also of the fabricated composite.

Improved bonding has been accomplished by plating the fiber with various metals, for example tantalum, with metal carbides, as for example whiskers of silicon carbide, and with nitrides.

More recently, rayon-based carbon fibers have been treated with various oxidizing agents in order to etch the surface of the fiber. Such oxidizing agents have included air, ozone, concentrated nitric acid, and a 3.3 percent by weight solution of sodium dichromate in concentrated sulfuric acid at 50° C. for 5 minutes. In most cases the oxidative treatment of rayon-based carbon fibers resulted in a decrease in ultimate tensile strength of the fiber and of the fiber-resin composite.

The primary structural properties of composites improve as carbon fiber content is increased up to about 65 volume percent then decrease as the fiber content exceeds that aforementioned figure. The preferred range of carbon fiber content is about 45 to 65 volume percent of fiber in the fabricated composite.

OBJECTS OF THE INVENTION

It is an object of this invention to provide a method for treating the surface of a carbon fiber to improve the properties of the fiber for use in resin-based composites.

It is further an object to provide a method for the production of a superior carbon fiber for use in resin-based composites containing surface treated carbon fibers, which composites possess superior shear strength properties over composites containing untreated fibers of the same material without concomitant loss in tensile strength.

Further objects will become evident to those skilled in the art upon a further reading of the description of this invention.

SUMMARY OF THE INVENTION

These objects are fulfilled by treating the surface of an acrylic-based carbon fiber by contacting the acrylic-based carbon fiber with a refluxing aqueous solution comprising about 5 to about 20 percent by weight of sodium dichromate or an equivalent amount of potassium dichromate, chromium trioxide or like source of chromic acid and about 15 to about 45 percent by weight of sulfuric acid for about 1 to about 60 minutes. Such surface treated acrylic-based carbon fibers, when incorporated into composites consisting of about 45 to about 65 percent of the fibers in a resin-matrix improve the shear strength of the composites over that of composites containing untreated fibers.

DETAILED DESCRIPTION OF THE INVENTION

As used in this description and claims, the term acrylic-based fibers consists of fibers spun by a typical wet-spinning or dry-spinning technique from a polymeric precursor containing no less than 85 mol percent of polyacrylonitrile and from about one to about 15 mol percent of one or more monovinyl substances copolymerized therewith, as for example methyl acrylate, methyl methacrylate, vinyl acetate, vinyl chloride, 2-methyl-2-vinylpyridine, and the like.

High modulus acrylic-based carbon fibers useful for this invention are defined as those carbon fibers possessing a tensile strength of greater than $100 \times 10^3$ p.s.i. tensile strength and a Young's modulus greater than $20 \times 10^6$ p.s.i. Such fibers can be prepared by the method of Shindo, "Studies in Graphite Fiber Report No. 317 of the Government Research Industrial Institute", Osaka, Japan, 1961, and Tsunoda, U.S. Pat. No. 3,285,636. Typically, acrylic-based fibers can be stretched to about 50 to 100 percent or more of their original length while heating in the presence of water or steam to about 100° C., oxidized in an oxidizing atmosphere at about 200° to 300° C. for a period of up to 4 hours, oxidized in a second stage in an oxidative atmosphere at 200° to 375° C., and pyrolyzed and/or graphitized at 1000° to 3000° C. in a non-oxidizing atmosphere to prepare a carbon fiber possessing a high modulus of elasticity and a high tensile strength.

Thus, by the term carbon fibers is meant any fiber which consists of greater than 95 weight percent carbon and preferably greater than 99 percent carbon which has been heated to from about 1000° C. to about 3000° C.

By the process of this invention the above-defined carbon fibers are contacted with an aqueous solution consisting of about 5 to about 20 percent by weight, preferably about 7 to about 14 percent by weight, of sodium dichromate or an oxidative equivalent of chromium trioxide, potassium dichromate or like source of chromic acid and about 15 to about 45 percent by weight, preferably about 15 to about 35 percent by weight, of sulfuric acid at the refluxing temperature of the aqueous solution at about normal sea level atmospheric pressure for about 1 to about 60 minutes. After this treatment, the fibers are washed with water to quench the reaction, and dried.

The method of this invention can be carried out as a continuous process or in small batches. In the continuous process modification of this invention, the size of the reaction vessel and the speed of the fiber through the oxidizing solution will determine the contact time of the fiber with the solution.

The fiber can be flexed or held rigidly while in contact with the oxidative solution without modifying the results obtained.

Typically, an acrylic-based carbon fiber, manufactured or graphitized as detailed above, is contacted with an aqueous solution at about 103° C. containing 14 percent by weight of sodium dichromate and 35 percent by weight of sulfuric acid for about 2 minutes, washed and dried.

Fibers prepared by the method of this invention can be used to prepare composites of superior shear strength.

Resins useful as matricies for the composites include epoxide, polyimide, polyamide, polyester, crystalline or amorphous poly-lower alkylene, and "Friedel-Crafts" type resins. By "Friedel-Crafts" type resin is meant a resin formed from an aromatic compound with an aromatic linking agent which has two groups, such as methoxymethyl or chloromethyl, attached to the aromatic nucleus, by means of a polycondensation reaction involving the nuclear hydrogen atoms, Trans. and J. of the Plastics Inst. (London) 32; No. 101, pp. 298–302 (1964).

The treated carbon fiber is incorporated in amounts of about 45 to about 65 percent by volume in the resin and polymerized in a manner well-known in the art to give a high shear strength composite. Exemplification of this method has been provided by Rees, U.S. Pat. No. 3,276,931, and Warner, U.S. Pat. No. 3,281,300.

The physical properties of the composite including tensile, compression, and shear strengths are measured by methods also well known in the art. More specifically, in order to prepare test composites, the fiber is wound onto a 7 inch diameter drum which contains an exterior 0.005 inch Teflon sheet coating. A transverse guide is driven at a constant rate based on yarn diameter to provide parallel alignment of the yarn without voids or overlap of the fibers. While winding, a solution of 38 weight percent epoxy resin (Shell Epon 826), 12 weight percent meta-phenylenediamine (E. I. Du Pont de Nemours), and 50 weight percent anhydrous methyl ethyl ketone in an amount 2 – 2½ times that required for the composite is added to the winding and the mandrel is heated to provide a surface temperature of 75° C. in order to effect a precure or B-stage in the resin system and evaporate the excess solvent. The additional material is provided to permit adequate flow and bleed-out. Winding is continued until a single layer of composite has been accumulated on the drum. The resulting composite is cut transversely, pulled from the drum, and spread flat on Teflon sheeting to provide a B-stage tape. Such tape is cut into appropriately dimensioned segments and the segments are stacked into a Teflon-lined mold, aligning the fibers, until an amount needed to form a 0.12 inch thick composite bar has been accumulated. The mold containing the stacked tapes is placed in a heated platen press, held under a pressure of 5 millimeters of mercury for 1 hour, then heated at 100° C. for 2 hours under a pressure of 300 p.s.i.g. and at 200° for 1 hour under the same pressure to effect cure.

The cured composite is tested for flexural strength, flexural modulus, tensile strength, tensile modulus, volume percent of fiber, shear strength, and density. A sample composite bar is loaded in a three-point configuration on a 2 inch span (the supports and loading surfaces being the radial faces of 0.5 inch diameter steel pins). Stress is applied until failure, giving a linear stress-strain curve from which the flexural strength and flexural modulus of the composite can be calculated. A second sample of the composite is loaded in a three-point configuration on 0.4 inch centers consisting of the radial surfaces of 0.375 inch diameter steel pins, providing a length to depth ratio of 3.3:1. The bar is flexed to failure. Depending upon the tensile properties of the reinforcing yarn and the quality of the resin matrix to graphite yarn interfacial bonding, three predominate modes of failure are noted. A transverse (tensile) failure showing a sharp peak in the stress-strain curve at the failure point results from high shear properties in conjunction with relatively lower tensile strength properties of the yarn. Shear strength values obtained with transverse failure of this type are not true indications of interlaminar shear strength but are minimum values since the tensile strength of the bar failed before a true shear failure value is attained. Low shear strength bars failed at the fiber-resin interface. Complex failures consisting of a combination of the above two types are obtained in samples of intermediate shear strength. Fiber volume is obtained by nitric acid digestion of the composite.

High modulus acrylic-based carbon fiber (8 micron fiber diameter, single ply yarn structure) was treated according to the above described procedure with varying conditions of concentration and time of reaction. Composites formed from 18 plies of the above prepared sample were fabricated into test bars using epoxy resin Epon 826 (Shell Oil Company) at about 60 percent fiber volume. Table I summarizes the results obtained. In the Table, column 1 shows time of contact of the carbon fiber with the solution in minutes; column 2 shows the concentration of sodium dichromate dihydrate; column 3 shows the concentration of sulfuric acid in the aqueous oxidizing solution; column 4 shows the flexural strength in pounds per square inch normalized to 60 volume percent fiber content of the composite bar prepared from the treated fiber; column 5 shows the actual volume of carbon fiber in the completed bar; and column 6 shows the shear strength in pounds per square inch of the completed composite bar.

Tables 2, 3, and 4 demonstrate the values obtained for the same physical constants for composites prepared and tested in the above manner from other carbon fibers of acrylic origin including a carbon fiber tow and a carbon fiber roving.

TABLE 1

| Time Minutes | %Na₂Cr₂O₇·2H₂O | %H₂SO₄ | Flexural Strength psi | Fiber Volume Volume % | Shear Strength psi |
|---|---|---|---|---|---|
| 0 | 0 | 0 | 84,300 | 57.6 | 4,850 |
| 2 | 14 | 34 | 110,000 | 58.2 | 5,800 |
| 5 | 14 | 34 | 112,000 | 56.0 | 7,470 |
| 15 | 14 | 34 | 95,000 | 60.5 | 10,420 |
| 30 | 14 | 34 | 85,000 | 59.4 | 10,320 |
| 60 | 14 | 34 | 101,00 | 63.9 | 10,150 |
| 30 | 7 | 17 | 103,000 | 54.9 | 8,150 |
| 60 | 7 | 17 | 120,000 | 61.6 | 9,180 |
| 60 | 7 | 34 | 91,200 | 58.1 | 9,920 |
| 60 | 14 | 17 | 120,000 | 48.5 | 9,460 |
| 60 | 12 | 43 | 92,600 | 60.1 | 10,100 |

TABLE 2

| Time Minutes | %Na₂Cr₂O₇·2H₂O | %H₂SO₄ | Flexural Strength psi | Fiber Volume Volume % | Shear Strength psi |
|---|---|---|---|---|---|
| 0 | 0 | 0 | 205,000 | 60 | 10,400 |
| 1.5 | 14 | 34 | 209,000 | 60 | 17,500 |
| 3.0 | 14 | 34 | 208,000 | 60 | 17,400 |

TABLE 3

| Time Minutes | %Na₂Cr₂O₇·2H₂O | %H₂SO₄ | Flexural Strength psi | Fiber Volume Volume % | Shear Strength psi |
|---|---|---|---|---|---|
| 0 | 0 | 0 | 163,000 | 60 | 3,800 |
| 1.5 | 14 | 34 | 233,000 | 60 | 11,100 |
| 3.0 | 14 | 34 | 213,000 | 60 | 13,300 |
| 5.0 | 14 | 34 | 208,000 | 60 | 15,300 |

TABLE 4

| Time Minutes | %Na₂Cr₂O₇·2H₂O | %H₂SO₄ | Flexural Strength psi | Fiber Volume Volume % | Shear Strength psi |
|---|---|---|---|---|---|
| 0 | 0 | 0 | 135,000 | 60 | 3,400 |
| 2.0 | 14 | 34 | 161,000 | 60 | 6,300 |
| 4.0 | 14 | 34 | 162,000 | 60 | 7,500 |
| 7.0 | 14 | 34 | 158,000 | 60 | 9,900 |
| 12.0 | 14 | 34 | 147,000 | 60 | 12,700 |

TABLE 5

| Time Minutes | %Na₂Cr₂O₇·2H₂O | %H₂SO₄ | Flexural Strength psi | Fiber Volume Volume % | Shear Strength psi |
|---|---|---|---|---|---|
| 0 | 0 | 0 | 270,000 | 60 | 5,800 |
| 1.0 | 14 | 34 | 302,000 | 60 | 15,800 |
| 2.0 | 14 | 34 | 282,000 | 60 | 17,200 |

We claim:
1. A method of treating high modulus acrylic-based carbon fibers which comprises contacting the fiber with an aqueous solution containing about 15 to about 35 percent by weight of sulfuric acid and about 7 to about 14 percent by weight of sodium dichromate or an equivalent thereof of a chromic acid producing salt at the refluxing temperature of the solution at normal sea level atmospheric pressure for about 1 to about 60 minutes.

* * * * *